United States Patent [19]
Coughren et al.

[11] Patent Number: 6,007,025
[45] Date of Patent: Dec. 28, 1999

[54] STOWABLE MODULE AIRPLANE LAVATORY

[75] Inventors: Brian D. Coughren, Kent; James D. Callahan, Bellevue; Michael I. Ruby, Kirkland; Bryan R. Dressler, Bainbridge Island; Peter J. Arnold, Seattle; Craig A. Auestad, Beelevue, all of Wash.

[73] Assignee: The Boeing Company, Seattle, Wash.

[21] Appl. No.: 08/772,500

[22] Filed: Dec. 23, 1996

[51] Int. Cl.[6] ........................................... B64D 11/06
[52] U.S. Cl. .................... 244/118.6; 244/118.5; 105/329.1
[58] Field of Search ............................. 244/118.5, 118.6, 244/122 R, 129.4; 105/329.1, 344

[56] References Cited

U.S. PATENT DOCUMENTS

| | | | |
|---|---|---|---|
| 1,850,747 | 3/1932 | Flagg. | |
| 2,681,016 | 6/1954 | Candlin, Jr. | 105/315 |
| 2,760,443 | 8/1956 | Gobrecht | 105/315 |
| 2,914,001 | 12/1959 | Murphy | 105/315 |
| 3,898,704 | 8/1975 | Gallaher et al. | 5/2 |
| 4,100,857 | 7/1978 | Gutridge et al. | 105/323 |
| 4,589,463 | 5/1986 | Ryan | 160/88 |
| 4,645,145 | 2/1987 | Alic | 244/118 |
| 4,884,767 | 12/1989 | Shibata | 244/118 |
| 5,150,863 | 9/1992 | Hozumi | 244/118 |
| 5,474,260 | 12/1995 | Schwertfeger et al. | 244/118.5 |

FOREIGN PATENT DOCUMENTS

| | | | |
|---|---|---|---|
| 0 503 493 | 9/1992 | European Pat. Off. | |
| 43 36 418 | 4/1995 | Germany. | |
| 9406663 | 3/1994 | WIPO | 105/329.1 |

OTHER PUBLICATIONS

Article "McDonnell Douglas eyes office in the sky" Commercial Aviation, New Products & Developments; Author: unknown; Date: unknown; Place of publication: unknown.

"Accessible Lavatory for the Physically Impaired" Author: unknown; Date: unknown Place of publication: unknown.

*Primary Examiner*—S. Joseph Morano
*Attorney, Agent, or Firm*—Carolos M. Herrera; John C. Hammar; Robert R. Richardson

[57] ABSTRACT

A stowable module, i.e., a storage container, that provides storage space in the airplane without occupying revenue floorspace. The stowable module comprises an integrated feature of a sidewall lavatory. The stowable module stows inside a sidewall lavatory during ground, takeoff, and landing operations. During flight, the stowable module is deployed by a flight attendant into an adjacent doorway area so that the lavatory can be used by passengers and crew.

27 Claims, 8 Drawing Sheets

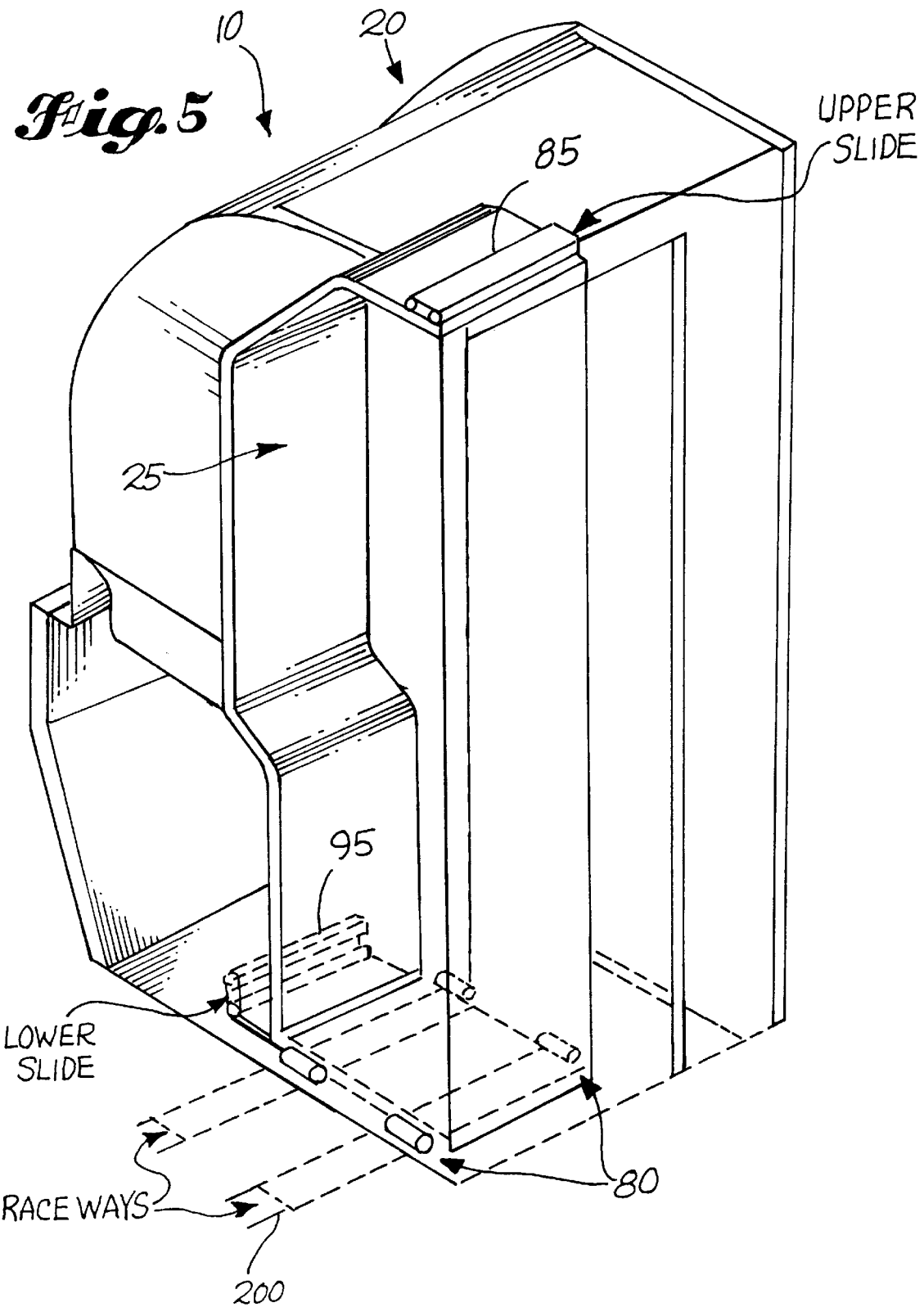

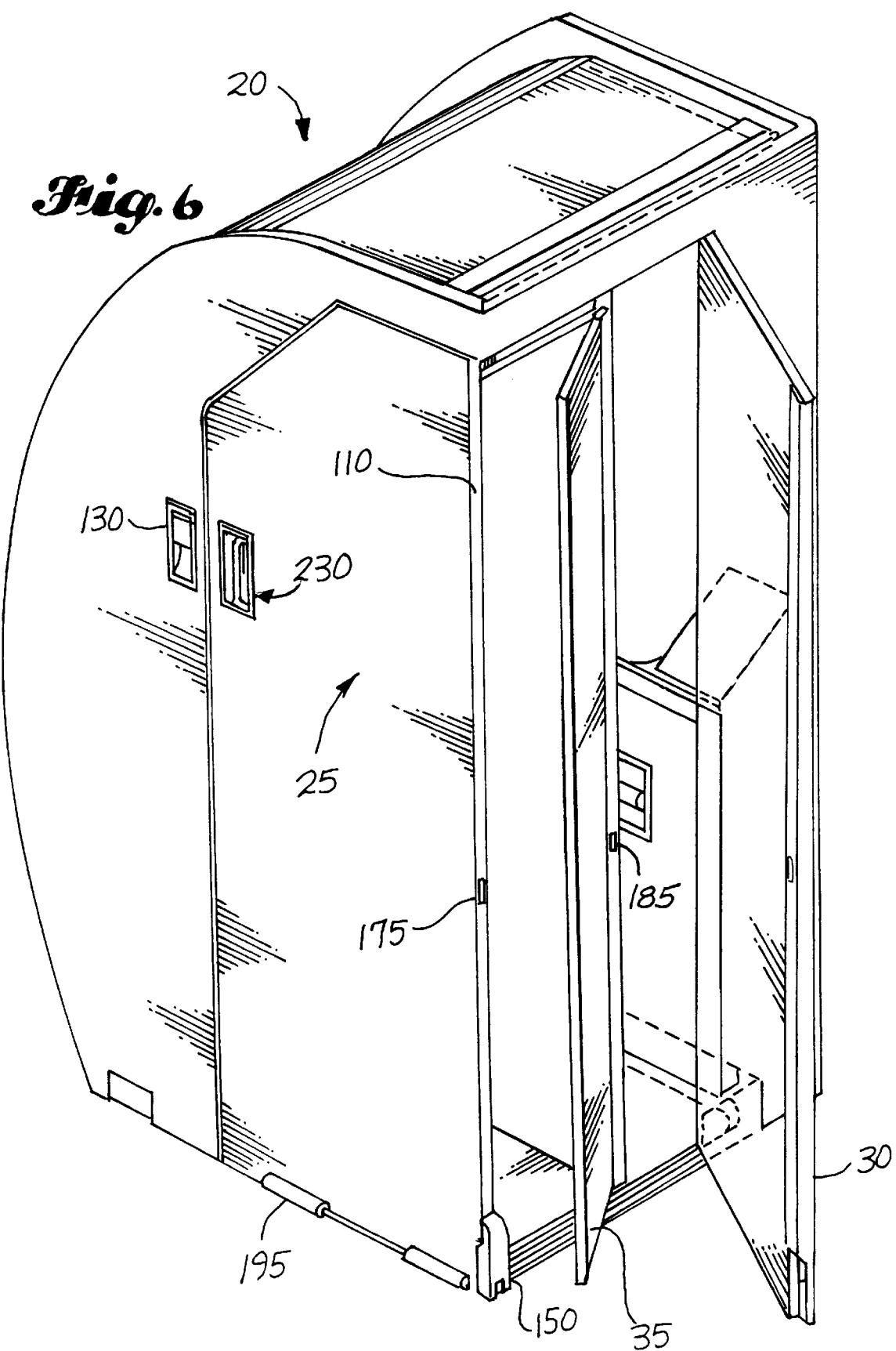

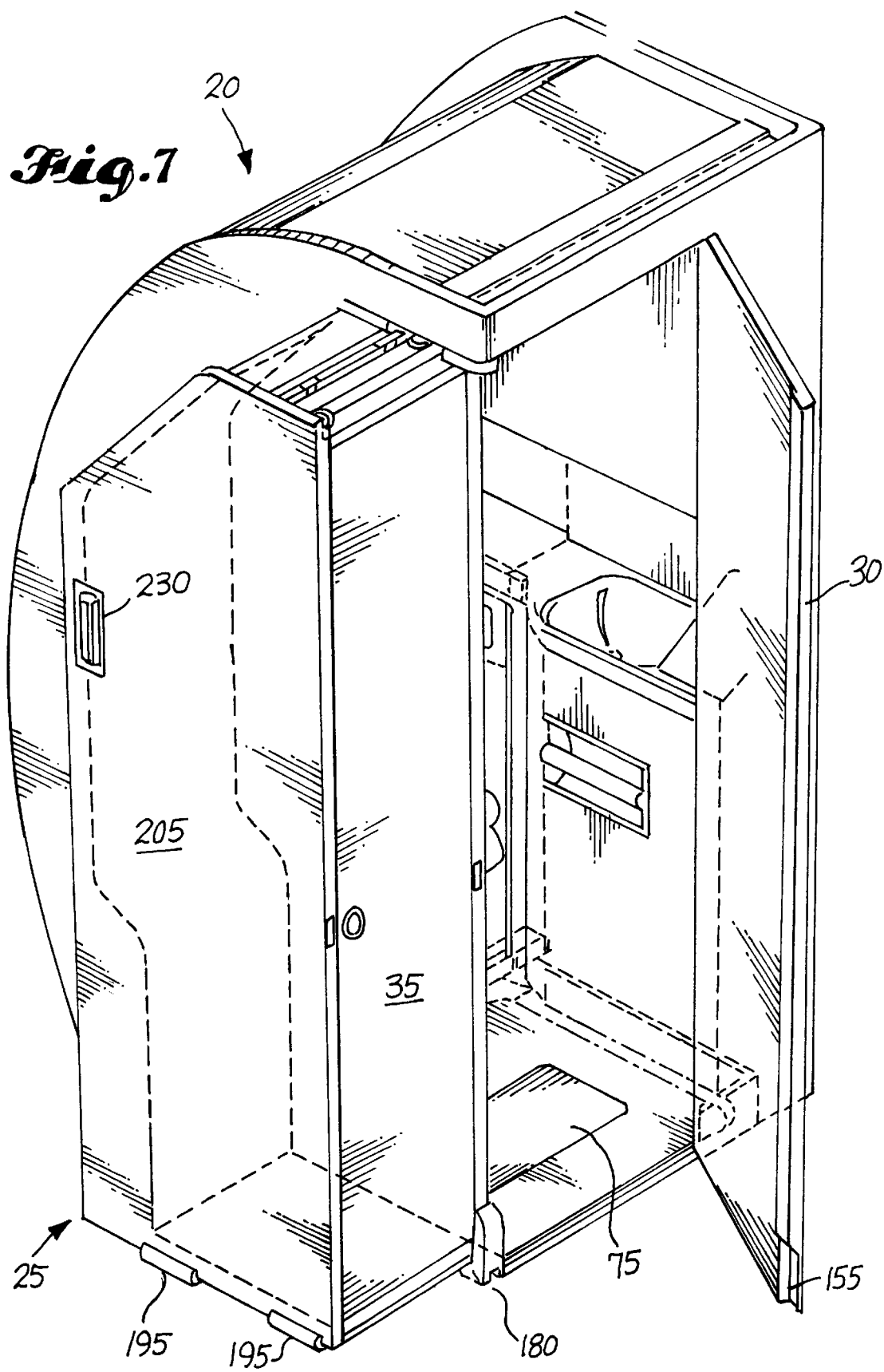

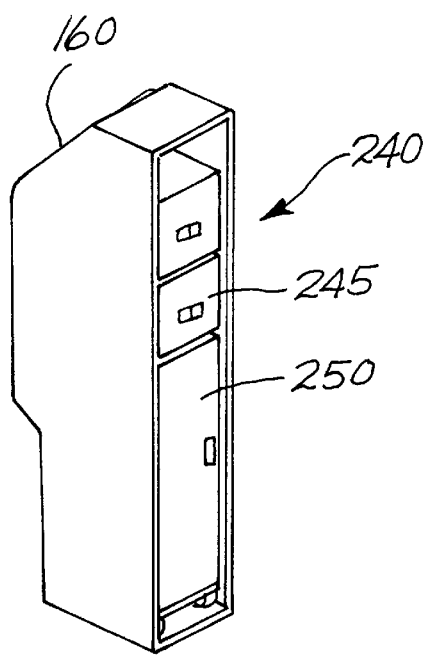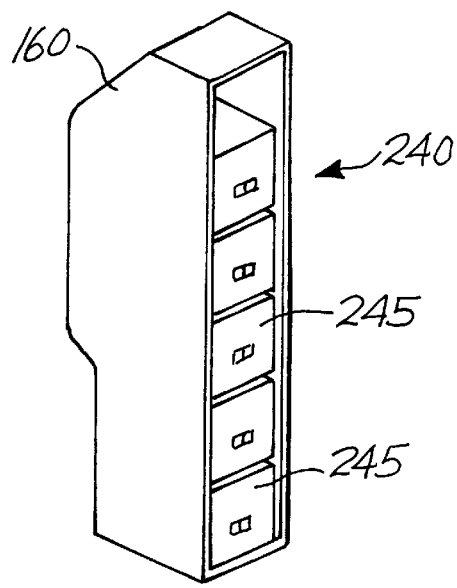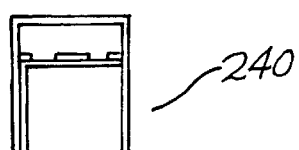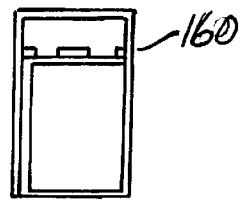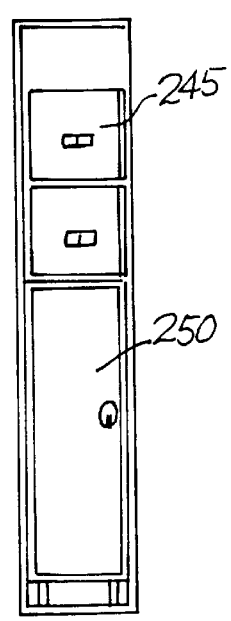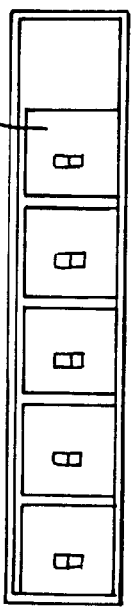
Fig. 9  Fig. 8
Fig. 12  Fig. 13  Fig. 10  Fig. 11

15

STOWABLE MODULE AIRPLANE LAVATORY

FIELD OF THE INVENTION

This invention relates to lavatories. More particularly, the present invention relates to a stowable module lavatory for use on board vehicles, such as airplanes. Still more particularly, the instant invention relates to stowable module airplane lavatories that use doorway space while the airplane is in flight.

BACKGROUND OF THE INVENTION

Providing lavatories on board airplanes is widely known. For examples of lavatories provided on board airplanes, see U.S. Pat. Nos. 5,150,863, issued Sep. 29, 1992, to Hozumi, 4,884,767, issued Dec. 5, 1989, to Shibata, 4,646,145, issued Feb. 24, 1987, to Alie, and 4,589,463, issued May 20, 1986, to Ryan. However, these fixed assembly lavatories are not concerned with the issues of doorway space utilization.

Doorway space utilization is the idea of making use of the floor areas and spaces immediately inboard of commercial airplane exit doors not needed during flight. The purpose of the present doorway space utilization concept is to increase the revenue generating capability of the commercial airplane. Doorway spaces are use for entry and departure from the airplane while on the ground and are required for emergency exit and attendant assist purposes. During flight, these spaces are largely unused.

By using doorway spaces during flight, there exists an opportunity to: (i) increase seat count, (ii) prevent seat (seat pan) loss, and (iii) add storage capacity. All of these opportunities can be used to increase the amount of revenue generated by the airplane thereby making the owner/operator of the airplane more profitable and the airplane more valuable to those commercial airplane customers.

Seat count gains are the most direct way to increase an airplane's value. Analysis of airline revenues and aircraft pricing indicates that each incremental seatpan added to an airplane of a given gross weight increases the value of the airplane at the time of sale by many hundreds of thousands of dollars. Avoiding the loss of a seatpan has the same impact on value.

Examples of apparatus providing increased space utilization on an airplane include an expandable volume lavatory disclosed in the aforementioned patent to Ryan and a convertible seat-bed disclosed in U.S. Pat. No. 3,898,704, issued Aug. 12, 1975, to Gallaher, etal. Also available for use on the McDonnell Douglas MD-11 commercial airplane is an accessible expandable lavatory for the physically impaired. When stowed, the lavatory is basically a conventionally sized module. When the need arises or on-demand, the lavatory can be expanded into the passenger doorway area to permit positioning of a wheelchair next to the toilet in the lavatory.

Increased storagle capacity can also be related in revenue or value terms. Most airlines would find additional storage capacity useful on their airplanes. This capacity might be used for providing additional services, such as duty-free sales, or might displace conventional monument storage off of revenue floorspace, like closet or galley trash volume. None of the patents disclosed above provide increased airplane storage capacity of the type afforded in the present invention.

SUMMARY OF THE INVENTION

An object of this invention is to provide a stowable module lavatory for use on board vehicles such as commercial airplanes.

Another object of the instant invention is the provision of a stowable module lavatory that can be expanded into the unused doorway space of an airplane.

Still another object of the present invention is the provision of increased stowage capacity for a commercial airplane.

These and other objects of the present invention are achieved through the provision of a stowable module subassembly in a airplane lavatory which takes advantage of the internal volume of fixed sidewall lavatories located adjacent to exit doors and the doorway space that is unused during flight. More particularly, the stowable module subassembly of the instant invention comprises a storage container that provides storage space in the airplane without occupying revenue floorspace and is an integrated feature of the sidewall lavatories of the present invention. The stowable module subassembly stows inside a fixed sidewall lavatory subassembly during ground, takeoff, and landing operations. During flight, the stowable module is deployed by a flight attendant into an adjacent doorway area so that the lavatory can be used by passengers and crew.

Doorway space utilization concepts of the present invention can make use of two different sizes of doors and doorways, namely Type 1 and Type A exits.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein:

FIG. 5 is a simplified view of the present lavatory illustrating certain important features of the fixed subassembly and the stowable module subassembly illustrated in FIGS. 3 and 4.

FIG. 6 is an enlarged isometric view of the complete stowable module airplane lavatory of the present invention in a stowed position.

FIG. 7 is an enlarged isometric view of the complete stowable module airplane lavatory of the present invention in a deployed position.

FIGS. 8 and 9 are isometric views of first and second alternative examples of stowable module inserts.

FIG. 10 is a front view of the stowable module insert of FIG. 9.

FIG. 11 is a side view of the module insert of FIG. 10.

FIG. 12 is a front view of the stowable module insert of FIG. 9.

FIG. 13 is a side view of the module insert of FIG. 12.

DETAILED DESCRIPTION OF THE PREFERRED EMBODIMENT

Figure 1:
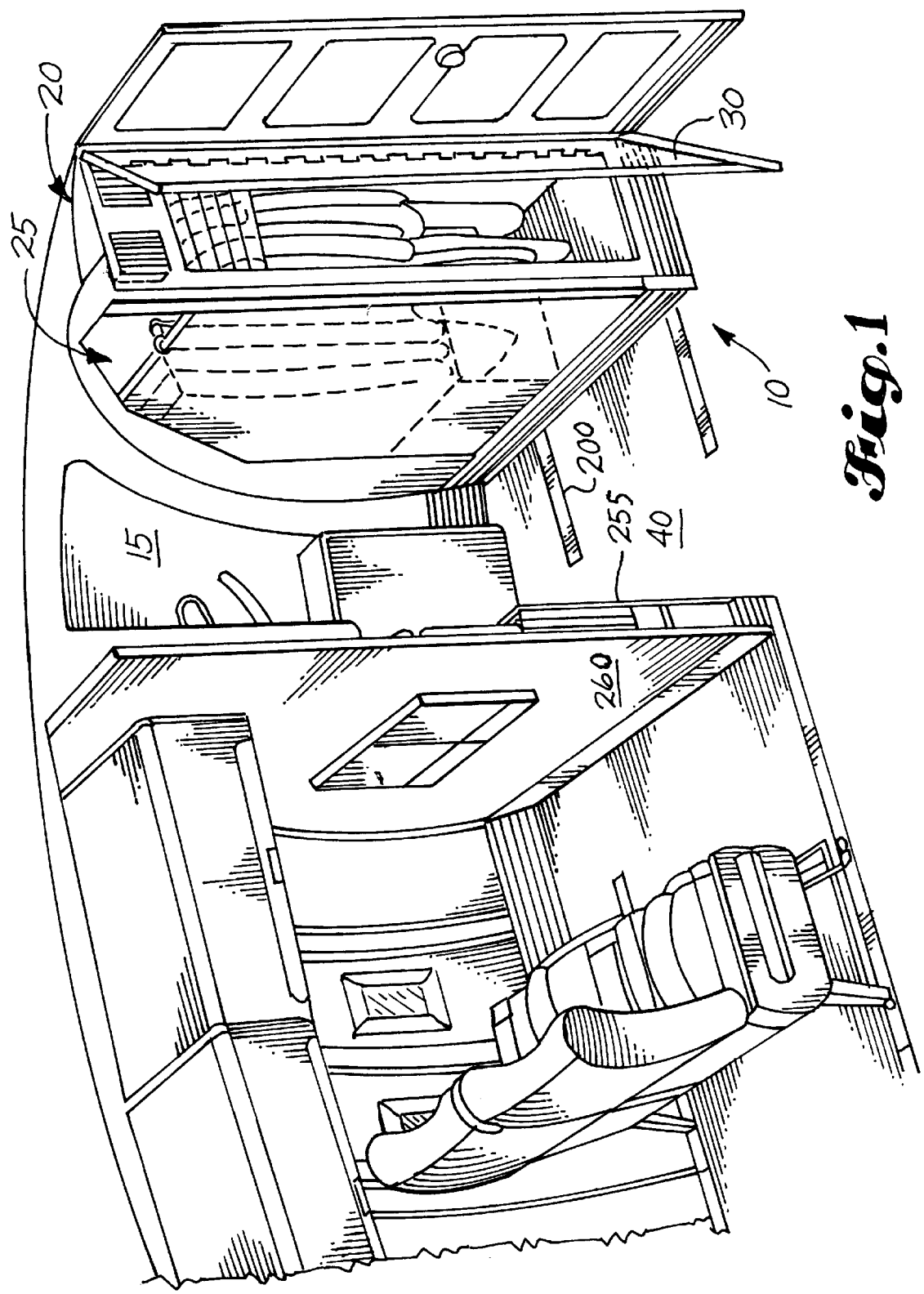
FIG. 1 is an simplified isometric view of the stowable module of the present invention in an undeployed or stowed position proximate an exit door way of an airplane.

As shown in FIG. 1, the present stowable module lavatory 10 is shown disposed proximate the exit door 15 of an airplane (not shown). The lavatory 10 comprises a fixed sidewall lavatory subassembly 20 and a stowable module subassembly 25. The module subassembly 25 is in the stowed position shown in FIG. 1 when the airplane is on the ground, taxiing, during takeoff and climbout. While on the ground, attendants can load passenger coats/baggage or service crew can remove/load galley items, as appropriate, from the module subassembly. Access to the inside of the stowed module subassembly 25 is through a lavatory door 30 and a module subassembly door 35 (not shown in FIGS. 1 and 2, but see FIGS. 6, 7).

Figure 2:
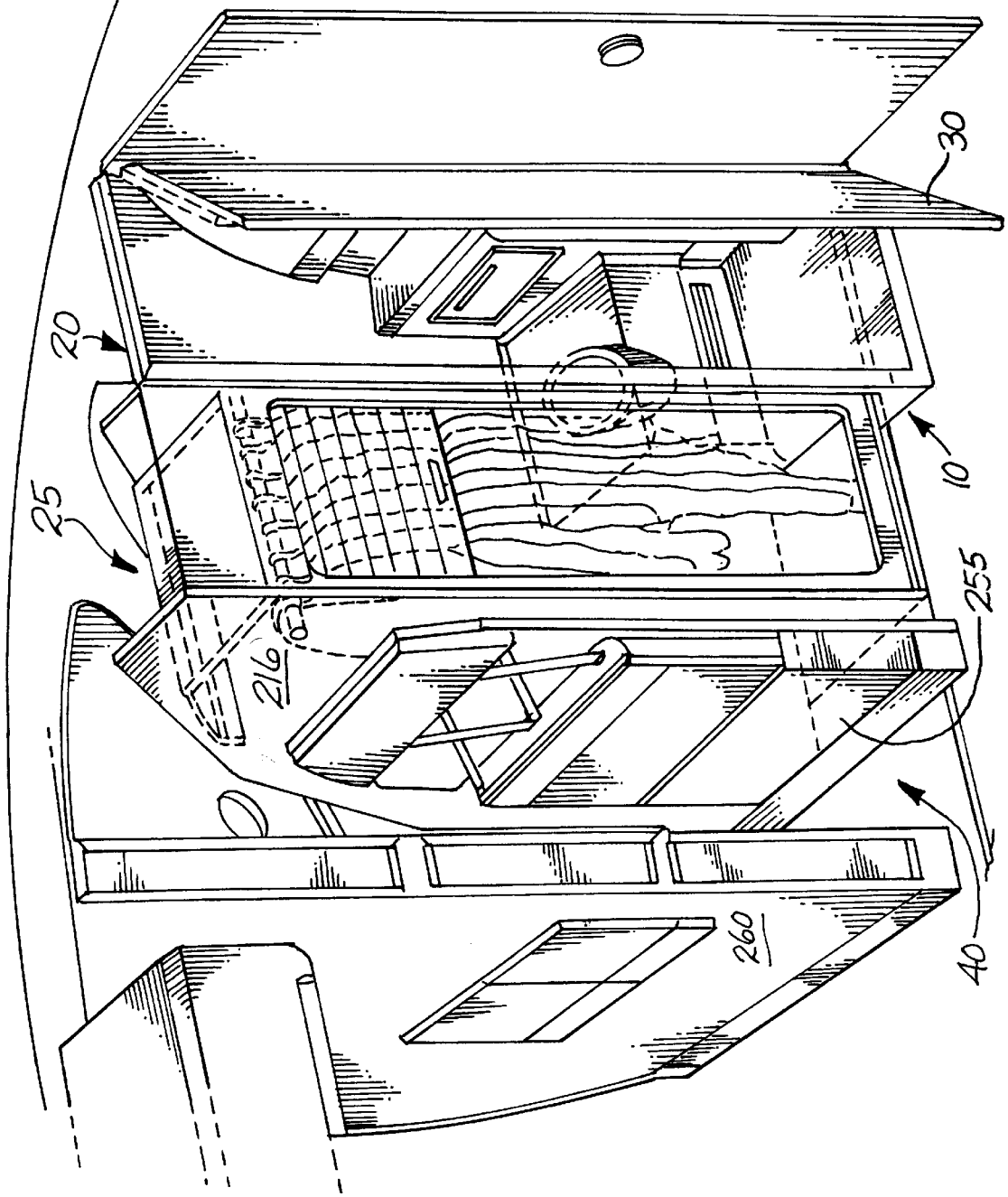
FIG. 2 is an isometric view of the module in a deployed position during flight within the unused inboard space proximate the exit door.

After takeoff and climbout, an attendant would unlock the module subassembly 25 and manually extend it into the doorway area or space 40, as shown in FIG. 2. Once extended, the module subassembly 25 is relocked in the deployed position. While deployed, access to the inside of the module subassembly is through the module door 35 whereas the lavatory 10) is available for passenger and crew use.

In the event of an inflight emergency or during landing preparations, an attendant would unlock the module subassembly 25, stow it back into the lavatory 10, and relock it in a stowed position. Before the module subassembly is stowed, a visual inspection of the interior of the lavatory 10 would be required to ensure that the lavatory was unoccupied and free of blockage items. The module subassembly 25 would remain stowed during final approach and landing.

After the airplane has parked at the airport gate, attendants would remove coats/baggage from the module subassembly 25 for deboarding passengers or service crew would remove/load galley items, as appropriate. While on the ground, the module subassembly 25 may need to be temporarily deployed to facilitate cleaning of the lavatory 10.

Figure 3:
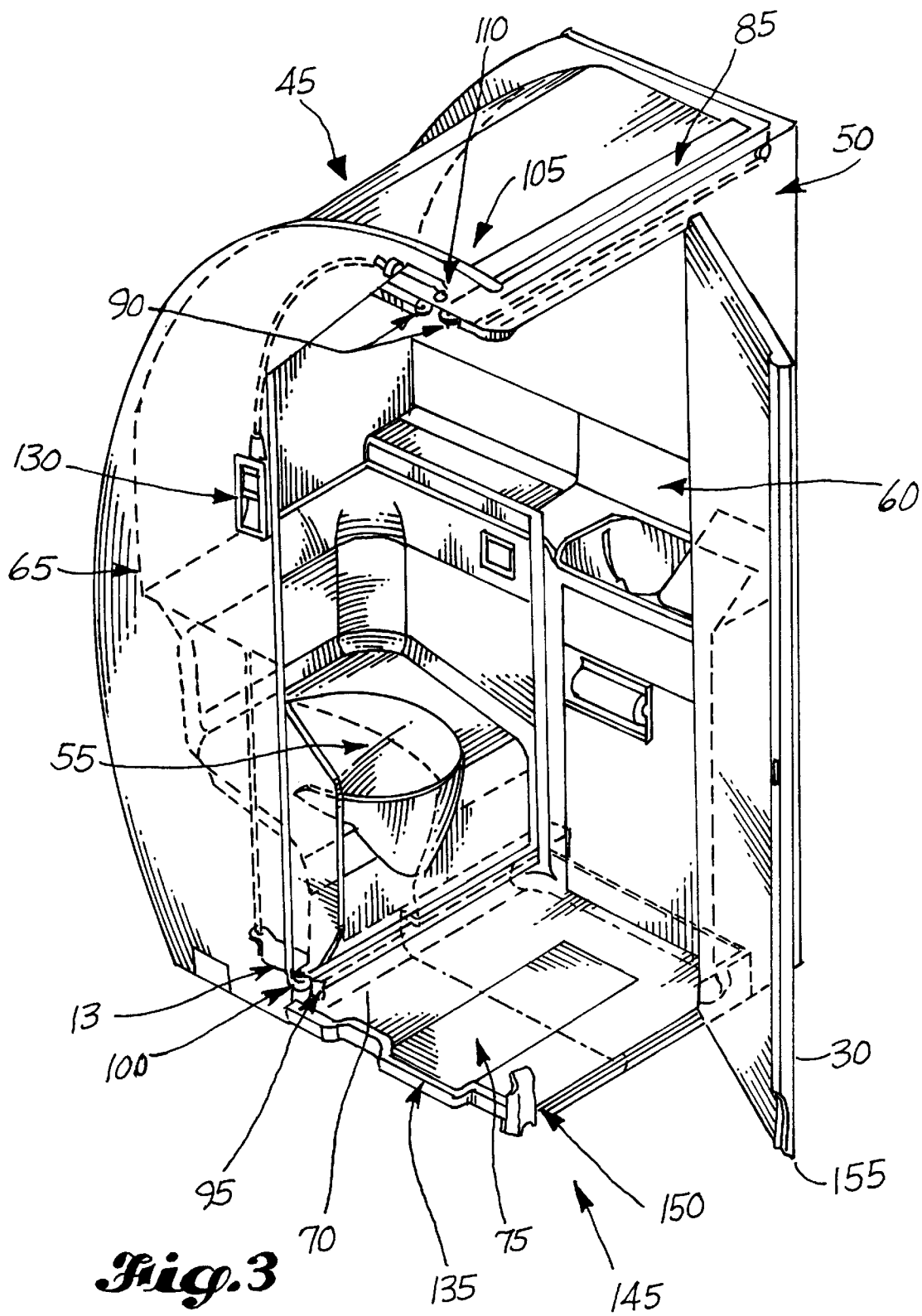
FIG. 3 is an simplified isometric view, facing outboard in the airplane, of a fixed sidewall lavatory subassembly which comprises the present lavatory.

As shown more particularly in FIGS. 3 and 5 the fixed sidewall lavatory subassembly 20 is substantially configured as a conventional lavatory with a few modifications. The lavatory subassembly will have enough mass typically to require airplane structural interfaces similar to that required by galleys installed at the same locations. The main forward-aft loads will be taken to airplane structure through tie rod(s) at the ceiling (not shown) and through seat tracks or hardpoint mounts at the floor (also not shown) that are similar to current galley installations.

Figure 4:
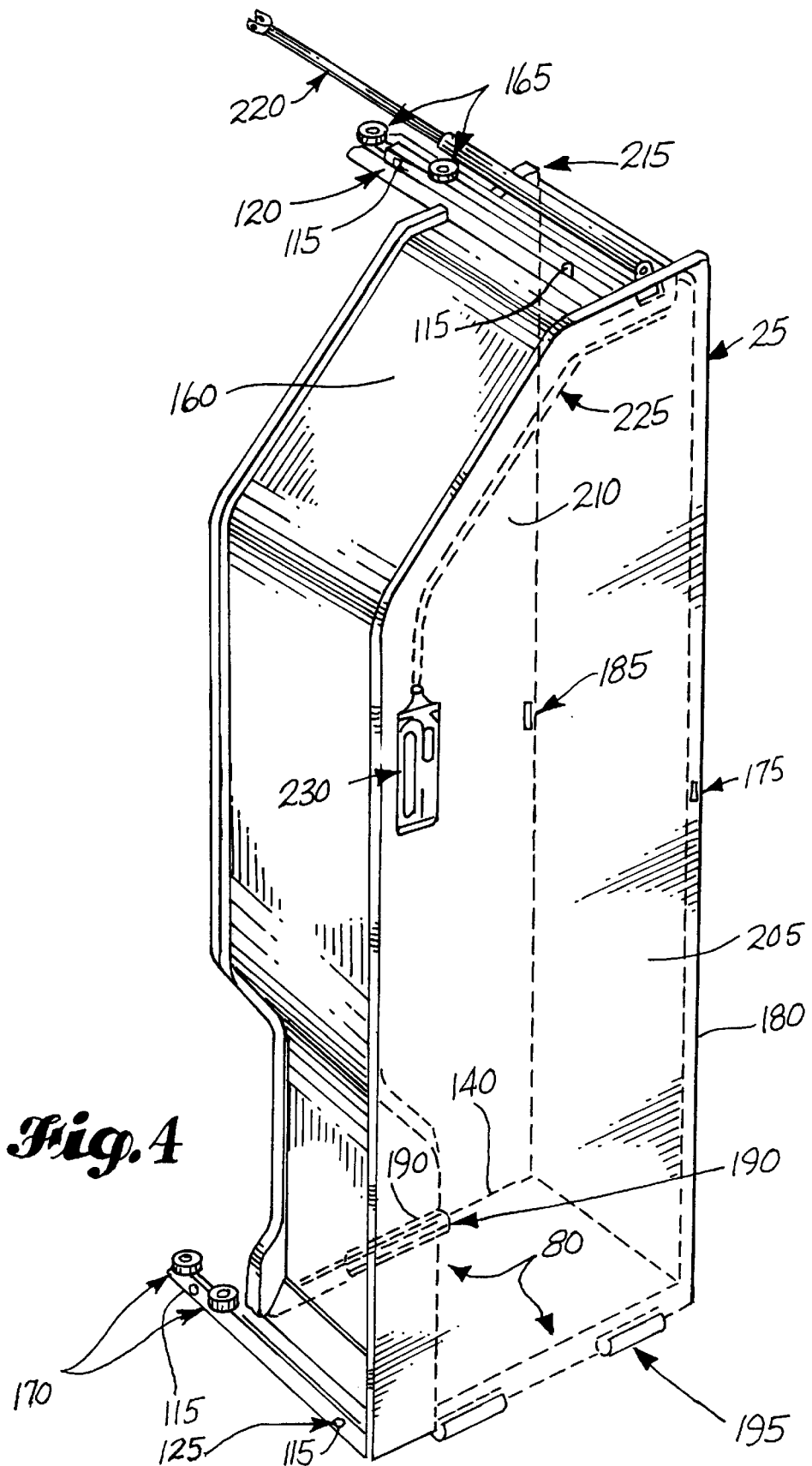
FIG. 4 is an isometric view of the stowable module subassembly of the present invention.

More particularly, the lavatory subassembly 20 comprises a back wall and ceiling section 45, complete side and aisle walls 50, toilet and shroud 55, sink and amenities 60. Additionally, the subassembly 20. comprises a novel cut away side wall 65 which receives and provides clearance for the module subassembly 25. The lavatory door 30 may be either a full panel or bi-fold, and extends to the edge of the lavatory subassembly 20 for incorporating corner trim. A floor pan 70 has reinforced load bearing surfaces 75 and is shaped to interface with load bearing rollers or wheels 80 supported on the module subassembly 25 (see FIGS. 4 and 5) while maintaining an appropriate lavatory threshold height. An upper track or tracks 85, a first plurality of rollers 90, and a lower track or tracks 95 along with a second plurality of rollers 100, provide directional stability for the module subassembly 25 during translation.

A locking system 105 for locking the lavatory 10 in fully deployed or stowed positions must be deactivated prior to translation of the module subassembly 25. The locking system 105 comprises spring-biased locking pins 110, suitably supported in the lavatory subassembly 20, which spring into forward and aft receptacles 115 disposed in a top roller rail or slide 120 and a bottom lower rail or slide 125 disposed on the module subassembly 25 (see FIGS. 3–5). The locking pins 110 are released by means of a conventional control latch 130 affixed on the side wall 65. The locking system 105 preferably has positive and visual indication (not shown) that the module subassembly 25 is locked and in the desired position.

A complementary interlocking surface 135 at the base of the lavatory floorpan 70 cooperates with a similar interlocking surface 140 at the base of the module subassembly 25. The interlocking surfaces 135, 140, along with an additional latching system 145 disposed at the front of the lavatory floorpan 70, prevents stowing the module into an occupied lavatory 10. The additional latching system 145 comprises a latch 150 which may be received in a recess 155 formed in the lower portion of the lavatory door 30.

As will be better understood, the module subassembly 25 and all associated hardware are housed within the fixed lavatory subassembly 20 when the module subassembly is stowed. More particularly, and with reference to FIG. 4, the module subassembly of the present invention comprises a box 160, sized to fit within the cut away side wall 65 of the lavatory subassembly 20, and any associated hardware required to facilitate translation of the module subassembly 25 between the lavatory subassembly and the exit doorway 15. The associated hardware comprises upper guide rollers 165 and lower guide rollers 170 which are insertable within and interface with the upper and lower roller tracks 85, 95 and the first and second plurality of rollers 90, 100, respectively. This combination of hardware provides directional stability during translation of the module subassembly between the stowed position shown in FIGS. 1, 5 and 6 and the deployed position shown in FIGS. 2 and 7.

A door jamb latch plate 175 is located on the exterior of framework 180 enclosing the door 35 of the module subassembly proximate a module door knob which is not shown 180 (doorway side latchplate). Another door jamb plate 185 is positioned on the framework 180 opposite the latch plate 175 proximate the lavatory subassembly 20 (lavatory side latchplate). When the module subassembly 25 is in the stowed position of FIG. 6, the doorway side latch 175 is used to secure the lavatory door 30. In the deployed position of FIG. 7, the lavatory side latchplate 185 is used.

Lavatory side load bearing rollers 190 are suitably supported on the module subassembly 25 and are positioned to compensate for the thickness of the lavatory floorpan 70 and to allow for full deployment of the module subassembly 25. Load bearing rollers 195 on the doorway side of the module subassembly are positioned to compensate for the thickness of the lavatory floorpan and allow the module subassembly 25 to be completely stowed without intrusion into the exit doorway 15.

The rollers 190, 195 ride on permanent flat metallic raceways 200 (or other suitable material), shown only in FIGS. 1 and 5 which are flush with doorway floor coverings. This may require special floor panels, and possibly secondary structure (not shown) such as intercostals between floor beams (not shown) to meet the strength and durability required. As suggested earlier, directional guidance, up loading, and side loading capabilities are provided by the upper roller track 85 and the lower roller track 95.

The forward and aft sides 205, 210 of the module box 160 cooperate with the cut away side wall 65 to create a seal 215 between the module subassembly 25 and the lavatory subassembly 20. Finally, a gas cylinder damper 220 is attached to the ceiling facing, forward side 210 of the box 160 for motion control during translation of the module subassembly. The damper 220 is coupled to a safety brake mechanism 225 comprising a release or brake release control handle 230 and associated conventional linkages. The damper 220 must be disengaged throughout the translation of the module subassembly 25 and acts as a "deadman" or safety brake and impact limiting mechanism during all translations of the module subassembly.

In use, while on the ground, the lavatory 10 is stowed as depicted in FIGS. 1, 5 and 6. The stowable module subassembly 25 is accessible through the lavatory door 30 for loading purposes in the stowed position. After reaching an assigned cruising altitude, an attendant would normally deploy the module subassembly 25 into the doorway area 40 as shown in FIG. 2 to allow use of the lavatory 10. Before landing, the attendant would stow the module subassembly 25 back into the lavatory subassembly 20. More particularly, to deploy the lavatory, an attendant would accomplish the following steps.

A flight attendant would first open the lavatory door 30 and operate the latch 150 located at the base of the module subassembly 25, unlocking it from the base of the lavatory subassembly 20. The attendant would then operate the control latch 130 located on the cut away side wall 65 thereby releasing locking pins 110 in the wall of the lavatory subassembly away from the receptacles 115. The safety brake mechanism 225 would be disengaged by depressing and holding the release or brake control handle 230. The module subassembly 25 could then be pulled out of the lavatory subassembly 20 by the attendant into the doorway space 40 to a point where the locking pins click into place in appropriate receptacles 115 in the roller rails 120, 125. The flight attendant would then re-engage the base latch 150. In this deployed position, both the interior of the lavatory 10 and the interior of the module subassembly 25 would be accessible. Stowing the module subassembly means following these steps in reverse order with the obvious exception that the attendant would have to push the module subassembly 25 back into the lavatory subassembly 20. In addition, the lavatory 10 would obviously not be accessible when in a stowed position.

The module subassembly provides extra space which could be outfitted for many different purposes. The available space afforded by the present invention is dependent upon the location of the present lavatory. Some passenger doorways (Type A versus Type 1 doors) are wider than others. For example, as illustrated in FIGS. 8–13, that extra space could accommodate a number of inserts 240 of different widths. More particularly, the inserts could store: a) closet items, e.g., coats, garment bags, etc. (see FIGS. 1 and 2); b) carry-on luggage (not shown) for passengers and crew, c) galley standard containers 245 for food and associated galley items (see FIGS. 9 and 12); d) galley trash (See FIG. 8); e) lockable galley half-size carts 250 (see FIGS. 9 and 12); f) emergency equipment (not shown), e.g., protective breathing equipment, bullhorn, etc., and g) miscellaneous equipment (not shown).

The stowable module airplane lavatory disclosed herein has been developed with several goals and assumptions in mind. For example, the stowable module concept should preferably be applicable to any model airplane. The interior envelope of the module subassembly 25 should preferably accommodate all standard sized items (e.g., coats, luggage, carts, containers, compacted trash, etc.) that are being considered for storage. This interior envelope should preferably be common between airplane models and lavatory locations to the extent possible. The interior should preferably be reconfigurable for different storage uses without requiring structural modification to the module subassembly 25. The exterior envelope of the module subassembly should preferably be common between airplane models and lavatory locations to the extent possible. The exterior envelope should clear lavatory sink and toilet envelopes. The exterior envelope may vary in order to accommodate lavatory/doorway envelope and interface considerations. The fundamental design (e.g., tracks, locks. access, lavatory interface, structural interface, functional operation, etc.) should preferably be common between airplane models and lavatory locations. Details of the mechanical design may vary as required. Inflight usage of doorway space, for the purposes described here must be acceptable to the regulatory agencies and customer airlines. Finally, the exit doorway 15 should preferably maintain some evacuation capability with the stowable module subassembly 25 deployed.

The stowable module concept of the present invention is applicable to most sidewall lavatories. Some lavatory positions are generally excluded because of restrictive doorway space or lavatory configuration and structural complexities. Some proposed lavatory positions may be difficult to utilize because of centerline monument or passage seat complications. Some lavatories will need to have the sink moved to the opposite side of the lavatory.

A single or double attendant seat 255 may be attached to a partition 260 or to the aft side 210 of the box 160 (see FIGS. 1 and 2, respectively). Some airplane models such as the Boeing Model 737 have limited alternate locations for attendant seat mounting.

There are a number of considerations that must be taken into account when mounting an attendant seat in the context of the present invention. For example, the stowable module airplane lavatories 10 of the present invention might be installed either forward or aft of exit doors. This means that the attendant seat 255 might be either forward facing or aft facing. A forward facing attendant seat would present a critical load case in that the seat loads would be trying to pull the stowable module subassembly 25 out of the lavatory 10. Double attendant seats (not shown) are wider than the stowable module subassembly cross-section. If a double attendant seat is to be mounted to the module subassembly 25, a panel (not shown in FIG. 4, but see FIG. 2) will need to extend off the side of the module assembly for attachment of the seat. Finally, the seats 255 are considered usable for takeoff and landing loads only when the stowable module is stowed.

Electrical connections and signals to the lavatory 10 will remain essentially the same as current lavatories. The stowable module lavatory of the present invention is planned to function as a manual unit and would not require additional power for an electrically actuated deployment and stowage system (although such may be optionally provided). A fire suppression system (not shown) may be necessary if the stowable module assembly 25 is used as a trash container.

Attendants panels and other electrical equipment might be attached in an appropriate position to the module subassembly. This may require the inclusion of a wiring harness (not shown) designed to deploy and stow with the stowable module subassembly 25, and to provide provisions to restrain, guide and protect this harness.

Potable water, toilet waste, and drain lines to the lavatory 10 are not affected. Additionally, the module subassembly of the present invention is not anticipated to store items that require plumbing interfaces although such may be optionally provided if desired.

As mentioned above, access to the exit doorway 15 is preferably maintained in all cases. This access will allow some evacuation capability at all doorways. Note that at many Type A doorway arrangements, a Type 1 exit rating can still be maintained with the present invention. Inflight usage of the attendant seat is not preferred at most Type 1 and some Type A doorways when the module subassembly 25 is deployed resulting in possible undesirable loss of attendant seating. At many Type A doorways, sufficient doorway space 40 is maintained in the present invention to allow inflight use of the attendant seat 255. Parking one or two galley carts 250 in the doorway 15 during meal service is possible with the present invention. Alternatively, some passenger standing space is still maintained by the present invention in the doorway 15. In some airplane models, galley access and usage may be restricted for galley units across the doorway 15 from the stowable module lavatory 10. Access to an attendant panel (not shown) is possible with the present invention. A stowable module unit at some airplane model doors may be unacceptable due to proximity to the passenger seat row aft of a doorway (not shown).

There must be an air barrier separating galley carts and standard containers from the air inside the lavatory i.e., the air inside the lavatory 10 must not be allowed to mix with the air inside the stowable module subassembly 25. This is to prevent viral and bacterial contamination of stored items and of the external handling surfaces of the carts and containers. When the module subassembly is stowed, hinged doors with air seals are an acceptable means of maintaining the air separation. Tambour type doors (not shown in FIG. 4, sub see FIG. 2) are discouraged because of the difficulty in cleaning tambour doors and the hidden spaces behind tambour doors. Storage of clothing and baggage will also require an air barrier between the lavatory 10 and the stowable module subassembly 25, although the level of sealing is not as critical as it is for galley storage. The module subassembly must meet all galley cleaning and sanitation requirements for both internal and external surfaces.

In the event of an inflight emergency, an attendant would have to quickly stow the module subassembly 25. A passenger occupying the lavatory 10 at that time would need to either quickly leave the lavatory or be forcibly removed. It is highly improbable that any failure condition caused by the failure, or any combination of failures, of the components of the stowable module lavatory 10 would prevent the continued safe flight and landing of an airplane. The structural reliability of the module subassembly should be designed to ensure that under defined load and operating conditions, the stowable module subassembly 25 will not represent a hazard to the airplane or the occupants.

While the principles of this invention have been described in connection with specific embodiments, it should be understood clearly that these descriptions are made only by way of example and are not intended to limit the scope of the invention.

What is claimed and desired to be secured by Letters Patent of the United States is:

1. A stowable module lavatory assembly for use in vehicles comprising:
    (a) a lavatory affixed proximate a doorway disposed in said vehicle, said lavatory having a side wall capable of receiving a module which is translatable from a stowed position within said lavatory to a deployed position substantially outside of said lavatory;
    (b) first locking means for securing an upper portion of said module when said module is in said stowed position and when said module is in said deployed position;
    (c) second locking means for securing a lower portion of said module when said module is in said stowed position and when said module is in said deployed position;
    (d) means for allowing translation of said module out of and into said lavatory;
    (e) means for limiting the motion of said module during translation of said module, and
    (f) third locking means for securing a lower portion of said module when it is in said stowed position and when it is in said deployed position.

2. The lavatory of claim 1, wherein said translation means comprises a plurality of rollers disposed on said lower portion of said module, an upper slide disposed on said upper portion of said module and a lower slide disposed on said lower portion of said module, said upper slide being provided with a first receptacle and said lower slide being provided with a second receptacle.

3. The lavatory of claim 2, wherein said first locking means comprises a first spring-biased pin supported in an upper portion of said lavatory, said second locking means comprising a second spring-biased pin supported in a lower portion of said lavatory, said first pin being insertable into said first receptacle and said second pin being insertable into said second receptacle when said module is locked in said stowed position or in said deployed position.

4. The lavatory of claim 3, wherein said motion limiting means comprises a safety brake and impact limiting mechanism disposed on said upper portion of said module.

5. The lavatory of claim 4, wherein said third locking means comprises a releasable latch disposed at the lower portion of said lavatory proximate said module, whereby when said latch is released, said module may be translated and when said latch is secured, said module may be locked in said stowed position or in said deployed position.

6. A process for using unused doorway space proximate a doorway disposed in a vehicle, said process comprising:
    (a) affixing a lavatory proximate a doorway disposed in said vehicle, said lavatory having a side wall capable of receiving a translatable module, said module being capable of being nestled within said lavatory when said module is in a stowed position;
    (b) securing said module within said lavatory in said stowed position;
    (c) releasing said module;
    (d) translating said module out of and into said unused doorway space;
    (e) limiting the motion of said module while it is being translated, and
    (f) securing said module in a deployed position outside of said lavatory and within said unused doorway space.

7. The process of claim 6, further comprising the steps of:
    (g) releasing said module from said deployed position;
    (h) translating said module from said deployed position to said stowed position within said lavatory;
    (i) limiting the motion of said module while it is being translated, and
    (j) securing said module in said lavatory in said stowed position.

8. A method for increasing the revenue generating capacity of an airplane by using unused passenger doorway space proximate a doorway disposed in said airplane, said airplane having a plurality of passenger seats, said method comprising:
    (a) installing a lavatory proximate said doorway;

(b) providing said lavatory with a translatable stowage module segregated from said lavatory;

(c) storing materials in said module either when said module is within or outside of said lavatory;

(d) translating said module from within said lavatory to a position within said unused space when said airplane is in flight;

(e) permitting passengers to occupy and use said lavatory without interference from said materials, and (f) stowing said module within said lavatory when said airplane is about to land.

9. A method for increasing the revenue generating capacity of an airplane, comprising:

(a) installing a lavatory proximate a passenger doorway of said airplane;

(b) providing said lavatory with a translatable stowage module that may be fixedly positioned within said lavatory;

(c) translating said module from within said lavatory to a position within inboard space proximate said doorway when said airplane is in flight, (d) stowing said module within said lavatory when said airplane is about to land, and (e) increasing the number of passenger seats in said airplane.

10. A process for using unused doorway space proximate a doorway disposed in a vehicle transporting passengers, said process comprising:

(a) affixing a lavatory proximate a doorway disposed in said vehicle, said lavatory having a partial side wall for receiving a translatable module segregated from said lavatory having stowage capacity, said module being capable of being nestled within said lavatory when said module is in a stowed position;

(b) securing said module within said lavatory in said stowed position;

(c) releasing said module;

(d) translating said module out of and into said lavatory when said vehicle is in motion;

(e) storing materials within said module either when said module is within or outside of said lavatory;

(f) permitting passengers to occupy and use said lavatory without interference from said materials, and (g) securing said module in a position outside of said lavatory.

11. A method for increasing the revenue generating capacity of an airplane transporting passengers, comprising:

(a) installing a lavatory proximate a passenger doorway of said airplane;

(b) providing said lavatory with a translatable stowage module segregated from said lavatory that may be fixedly received proximate said lavatory;

(c) translating said module to a position away from said lavatory within inboard space proximate said doorway when said airplane is in flight;

(d) storing materials within said module when said module is either within or outside of said lavatory;

(e) permitting passengers to occupy and use said lavatory while said aiplane is in flight without interference from said materials, and (f) stowing said module within said lavatory when said airplane is about to land.

12. A method for increasing the revenue generating capacity of an airplane, comprising:

(a) installing a lavatory proximate a passenger doorway of said airplane;

(b) providing said lavatory with a translatable stowage module that may be fixedly received proximate said lavatory;

(c) translating said module to a position within inboard space proximate said doorway when said airplane is in flight;

(d) stowing said module within said lavatory when said airplane is about to land, and (e) increasing the number of passenger seats within said airplane.

13. An assembly for using unused space proximate a doorway disposed in a vehicle transporting passengers, said assembly comprising:

(a) a lavatory subassembly, said subassembly comprising a substantially solid wall having an opening;

(b) a stowable module subassembly capable of freely translating through said opening from a stowed position within said lavatory subassembly to a deployed position in said unused space, said module subassembly having a forward and an aft section;

(c) a plurality of module rollers affixed to the forward and aft sections of said module subassembly for permitting translation of said module subassembly, and (d) a latch for securing said module subassembly in said stowed position and in said deployed position.

14. The assembly of claim 13, wherein said lavatory subassembly further comprises an upper roller track and a lower roller track for facilitating translation of said module subassembly.

15. The assembly of claim 14, wherein said module rollers comprise an upper guide roller and a lower guide roller, said upper guide roller being insertable within and interfacing with said upper roller track, and said lower guide roller being insertable within and interfacing with said lower roller track, whereby directional stability of said module subassembly may be provided when said module subassembly is being translated.

16. The assembly of claim 15, wherein said upper guide roller is supported by an upper module guide rail extending along said module subassembly, said lower guide roller is supported by a lower module guide rail extending along said module subassembly, said upper module guide rail being insertable within said upper roller track, said lower module guide rail being insertable within said lower roller track, and a plurality of receptacles formed in said upper module guide rail and in said lower module guide rail.

17. The assembly of claim 16, further comprising a locking system supported by said lavatory subassembly, said locking system comprising a control latch for activating said locking system, said control latch activating at least one spring biased pin which is insertable into one of said plurality of receptacles.

18. The assembly of claim 17, further comprising a plurality of spring biased pins, at least one of said pins being insertable in each of said receptacles, whereby when it is desired to translate said module subassembly, all of said pins are removed from all of said receptacles by said control latch and when it is desired to lock said module subassembly in either said stowed position or in said deployed position, all of said pins are inserted into said receptacles.

19. The assembly of claim 18, wherein said module subassembly is provided with an interlocking surface disposed at the lower portion of said module subassembly, said lavatory subassembly is provided with a complementary interlocking surface disposed at the lower portion of said lavatory subassembly, whereby when said module subassembly is in said stowed position, said interlocking surface mates with said complementary interlocking surface to secure said module subassembly relative to said lavatory subassembly.

20. The assembly of claim 18, further comprising a positive and visual warning that indicates that said module subassembly is locked in a desired position.

21. The assembly of claim 18, wherein said lavatory subassembly is provided with a door providing passengers with privacy, said door being provided with a recess formed in the lower portion thereof for receiving an additional latch.

22. The assembly of claim 15, further comprising a gas cylinder damper attached to said module subassembly for motion control during translation of said module subassembly.

23. The assembly of claim 17, further comprising a gas cylinder damper attached to said module subassembly for motion control during translation of said module subassembly.

24. The assembly of claim 13, wherein said module rollers ride on permanent flat metallic raceways, said raceways being positioned within said unused space.

25. The assembly of claim 13, wherein a seal is formed between said lavatory subassembly and said module subassembly.

26. The assembly of claim 13, wherein a seat may be secured to said module subassembly.

27. The assembly of claim 13, further comprising a gas cylinder damper attached to said module subassembly for motion control during translation of said module subassembly.

\* \* \* \* \*